No. 734,502. Patented July 28, 1903.

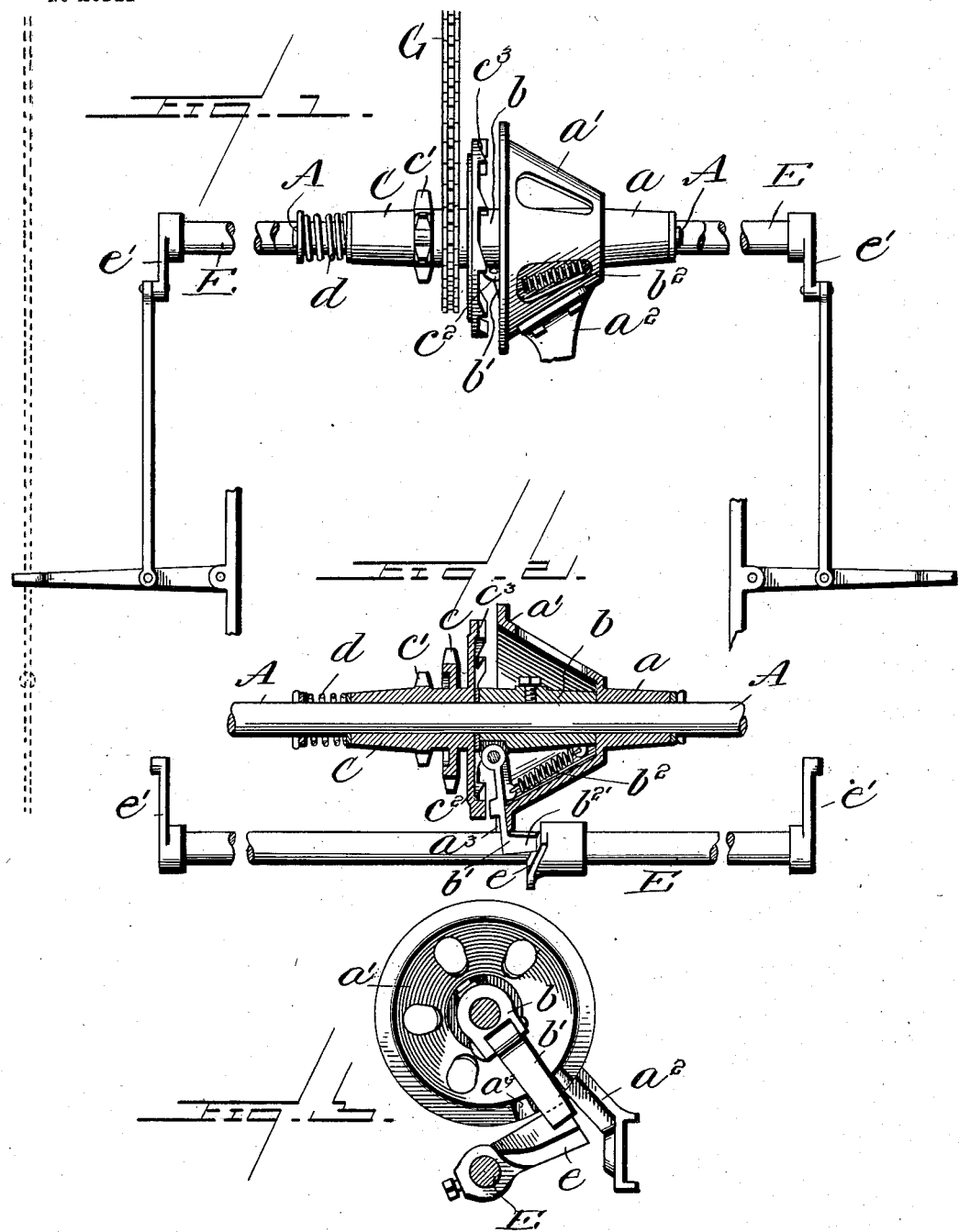

UNITED STATES PATENT OFFICE.

WILLIAM L. BEALL, OF ALBION, MICHIGAN, ASSIGNOR TO GALE MANUFACTURING COMPANY, OF ALBION, MICHIGAN.

CLUTCH FOR PLANTERS.

SPECIFICATION forming part of Letters Patent No. 734,502, dated July 28, 1903.

Application filed March 18, 1903. Serial No. 148,429. (No model.)

*To all whom it may concern:*

Be it known that I, WILLIAM L. BEALL, a citizen of the United States, residing at Albion, in the county of Calhoun and State of Michigan, have invented certain new and useful Improvements in Clutches for Planters; and I do hereby declare the following to be a full, clear, and exact description of the invention, such as will enable others skilled in the art to which it appertains to make and use the same.

My present invention relates to clutches, and more particularly to that class of clutches which are used for the purpose of bringing certain mechanical parts into action for a limited period whereby a shaft is brought into action for one revolution or a part of such revolution.

In the accompanying drawings I have shown such a clutch applied to the seeder-shaft of a planter; and my invention is disclosed in the following description and claims.

In the drawings, Figure 1 is a plan view of my improved clutch with only such parts connected therewith as are required to show the mode of operation of the same. Fig. 2 is a partial sectional view, and Fig. 3 is a detail view, of the main clutch member.

In the figures, A is the seeder-shaft, in which is mounted a sleeve $a$, having the clutch box or casing $a'$ integral therewith or secured thereto. This box or casing $a'$ is secured to some stationary part of the planter-frame by the bracket $a^2$, which holds the box or casing and the sleeve $a$ stationary. The sleeve $a$ is not secured to the shaft, the said shaft being free to rotate within the same. The box or casing is provided on its outer face with a notch or recess $a^3$. Within said box or casing a sleeve $b$ is secured to the shaft A to rotate therewith. To the sleeve $b$ is pivoted the dog or latch $b'$, and this dog or latch is held against the outer face of the box or casing or within the notch or recess in such face by a spring $b^2$. A sleeve C is also loosely mounted on the shaft A in close relation with the sleeve $b$ and dog $b'$. This sleeve is provided with one or more sprocket-wheels $c\ c'$ and with a disk $c^2$, having a ratcheted flange $c^3$. This ratchet-flange $c^3$ extends toward the outer face of the box or casing $a'$, with a short space between them, and this relation between the two devices is preferably maintained by a coiled spring $d$. The dog $b'$ is provided with a projection to engage the teeth of the ratchet when it is moved out of the recess $a^3$ of the box or casing and also on its opposite side with an arm or projection $b^{2'}$, by which the dog may be forced out of the recess $a^3$ and into engagement with the ratchet.

A rock-shaft E is located parallel with the shaft A, and this rock-shaft is provided with a cam-arm $e$. This arm is so located and its cam-face so constructed that when the arm $e$ is turned toward the clutch it will engage the arm or projection $b^{21}$ of the dog and force the same toward the ratchet and cause it to engage with the teeth of the same. This rock-shaft is provided with crank-arms $e'\ e'$, which are connected with the forked levers of any ordinary check-row planter, which levers are moved or caused to be moved by the ordinary knotted cord or wire.

G is a sprocket-chain operated by some moving part of the planter to give a constant rotation to the sleeve C and the ratchet-disk.

In operation the sleeve C and the ratchet is given a constant rotation. At the desired intervals of time the rock-shaft E is turned to force the arm $e$ against the arm or projection $b^{2'}$ of the dog $b'$. The cam-face of the arm $e$ forces the dog out of the recess $a^3$ and into engagement with the teeth of the ratchet. The ratchet being in motion carries the dog past the recess $a^3$. As the dog is pivoted to the sleeve $b$ and the sleeve is secured to the shaft A, this shaft is moved by the ratchet until the dog $b'$ again reaches the recess $a^3$, when the spring withdraws it from engagement with the ratchet and the movement of the shaft A ceases.

The outer face of the box or casing when unbroken holds the dog in engagement with the ratchet. The shaft may be given less than a single rotation by providing the outer face of the box or casing with a recess to receive the dog $b'$ at the point or points desired and providing means adjacent thereto for forcing it out into engagement with the ratchet.

I do not limit myself to the shaft E and arm $e$ for throwing the dog $b'$ into engagement with the ratchet, as other means may be employed to effect this.

What I claim, and desire to secure by Letters Patent, is—

1. A clutch of the class described, comprising the dog, the ratchet, a surface for engaging the dog and holding it in engagement with the ratchet for a space not exceeding one revolution, and means for throwing the dog into and out of engagement with the ratchet, substantially as described.

2. The combination with a seeder-shaft, of the dog operatively connected with the seeder-shaft, the ratchet, a surface for holding the dog in engagement with the ratchet for a space not exceeding one revolution, means for operating said ratchet and means for throwing said dog into and out of engagement with said ratchet, substantially as described.

3. A clutch comprising the ratchet, a box or casing having its outer face parallel with the ratchet, and having a notch in said face, the dog, means for throwing the dog into engagement with the ratchet, and a spring for retracting it, substantially as described.

4. A clutch of the class described, comprising the ratchet, a box or casing having a face parallel with said ratchet and having a notch in said face, the dog, the retracting-spring connected with said dog, and the shaft and cam-faced arm for throwing the dog into engagement with the ratchet, substantially as described.

In testimony whereof I affix my signature in the presence of two witnesses.

WILLIAM L. BEALL.

Witnesses:
G. W. BORTLES,
EARLE KNIGHT.